US006132482A

United States Patent [19]

Perry

[11] Patent Number: 6,132,482

[45] Date of Patent: Oct. 17, 2000

[54] ABRASIVE LIQUID SLURRY FOR POLISHING AND RADIUSING A MICROHOLE

[75] Inventor: Winfield B. Perry, Lexington, Mass.

[73] Assignee: Dynetics Corporation, Woburn, Mass.

[21] Appl. No.: 09/100,479

[22] Filed: Jun. 19, 1998

Related U.S. Application Data

[62] Division of application No. 08/748,050, Nov. 12, 1996, Pat. No. 5,807,163.

[51] Int. Cl.[7] .......... C09K 3/00

[52] U.S. Cl. .......... 51/293; 51/307; 51/308; 51/309

[58] Field of Search .......... 51/393, 307, 308, 51/309; 106/3

[56] References Cited

U.S. PATENT DOCUMENTS

| | | | |
|---|---|---|---|
| 2,195,055 | 3/1940 | Wallace | 451/61 |
| 3,521,412 | 7/1970 | McCarty | 451/61 |
| 3,753,879 | 8/1973 | Blee | 204/129.2 |
| 3,823,514 | 7/1974 | Tsuchiya | 51/281 P |
| 3,886,697 | 6/1975 | Feldcamp | 51/317 |
| 3,909,217 | 9/1975 | Perry | 51/298 |
| 4,087,943 | 5/1978 | Perry | 51/317 |
| 4,203,257 | 5/1980 | Jamison et al. | 51/2 R |
| 4,936,057 | 6/1990 | Rhoades | 51/317 |
| 5,054,247 | 10/1991 | Rhoades et al. | 51/317 |
| 5,177,904 | 1/1993 | Nagel et al. | 51/165.93 |
| 5,247,766 | 9/1993 | Kildea | 51/317 |
| 5,855,633 | 1/1999 | Simandl et al. | 51/309 |

FOREIGN PATENT DOCUMENTS

WO 87/05552 9/1987 WIPO .

*Primary Examiner*—C. Melissa Koslow

*Attorney, Agent, or Firm*—Samuels, Gauthier & Stevens

[57] ABSTRACT

A system and method for radiusing and sizing microholes in diesel fuel injectors. A liquid abrasive slurry with rheological properties is used. As the slurry approaches and flows through the microhole, it is at first at a lower viscosity. Subsequently, the slurry is characterized by a high viscosity which enables the use of a flow meter in the slurry flow path which directly and accurately monitors slurry flow rate and mass flow in real time. This allows for the individual slurry processing of nozzles to their specified flow rate in a continuous process.

10 Claims, 5 Drawing Sheets

ABRASIVE LIQUID SLURRY FOR POLISHING AND RADIUSING A MICROHOLE

CROSS-REFERENCE TO RELATED APPLICATIONS

This is a division of application Ser. No. 08/748,050, filed Nov. 12, 1996, U.S. Pat. No. 5,807,163, which claims the benefit of application Ser. No. 08/511,313, filed Aug. 4, 1995, now abandoned.

FIELD OF THE INVENTION

This invention relates to the use of an abrasive liquid slurry to radius and smooth a microhole.

BACKGROUND AND BRIEF SUMMARY OF THE INVENTION

In many applications, such as fuel injector nozzle tips, carburetor jets, cooling air flow through turbine engine components, lubricating oil metering for precision bearings and the like, metering of flow rates is of very great importance. However, due to manufacturing artifacts, it is of great difficulty. Even minute variations in manufacturing tolerances can produce substantial variations in flow resistance and flow.

Parts having fluid flow orifices are made by a wide variety of casting and machining procedures. For example, high quality investment castings are frequently employed for the manufacture of such parts. Even the high quality parts will have variations in dimensions, particularly wall thicknesses attributable to slight core misalignments or core shifting, and other variations in surface conditions, including surface roughness, pits, nicks, gouges, blow holes, or positive metal. In the extreme case, a very slight crack in a core can lead to a thin wall projecting into an internal passage. All these artifacts will substantially impede fluid flow.

Commonly employed machining methods, such as conventional drilling, electrical discharge machining and even less usual techniques as laser, electron beam and electrochemical techniques are not sufficiently precise to avoid the generation of substantial variations in flow resistance. Probably, the most precise of these, electrical discharge machining, will not produce perfectly uniform flow resistance because non-uniform EDM conditions are inevitable and may produce variations in size, shape, surface finish and hole edge conditions.

Such deviations are necessarily tolerated within broad limits and the attendant compromises in design freedom, performance and efficiency are accepted as unavoidable. For example, the delivery of fuel charges to internal combustion engines by pressurized fuel injection requires metering of flow through injector nozzles. The more precisely the flow can be regulated, the greater the fuel efficiency and economy of the engine operation.

At present, the design of such fuel injector nozzles is often based on the measurement of the actual flow resistance. The nozzles are segregated into different ranges of flow parameters to provide at least approximate matching of components within a range of deviation from defined tolerances. The inventory requirements for the matching of components is quite substantial and therefore very costly. In addition, a substantial number of components must be rejected as out of allowable deviations and must be reworked at considerable expense or discarded.

With diesel fuel injector nozzles, it has been found desirable to radius the inlet side of the injector microholes in order to eliminate stress risers and pre-radius the upstream edge to minimize changes in emissions over the design life of the nozzle. Conventional abrasive flow machining can effectively produce radii on microholes, but fine control of the final injector flow rate has been impossible to achieve. The high, putty-like viscosity and highly elastic character of conventional abrasive flow media are too radically different from the characteristics of diesel fuel to permit either in-process gauging or adaptive control of this process. Furthermore, the very small quantity of abrasive flow media required to produce the desired radius limits process resolution.

Briefly, in abrasive flow machining (AFM) of microholes the flow rate of the material does not correlate well to the flow rate of the target liquid. Therefore, the actual calibration of a microhole is a step-by-step fine tuning process. After radiusing and smoothing the microhole with AFM, the target liquid or calibration liquid is tested in the microhole, the microhole is further worked and the target liquid or calibration liquid is again tested, etcetera, until the target liquid tests correctly.

The present invention is based upon a statistically meaningful correlation between the flow rate of a liquid abrasive slurry through a microhole to a target liquid flow rate. When the abrasive liquid slurry reaches a predetermined flow rate the microhole is properly calibrated for the target liquid.

Liquid abrasive slurry flow as employed in the present application includes the flow of abrasives suspended or slurried in fluid media such as cutting fluids, honing fluids, and the like, which are distinct from semisolid polymer compositions. The liquid abrasive slurry of the invention is comprised of a liquid media, a Theological additive and abrasive particles. The abrasive particles remain uniformly distributed when the slurry is subjected to shear and the slurry decreases in viscosity when subjected to shear flowing through a microhole at a pressure of between 400 to 1000 psi.

The invention finds utility in the radiusing, polishing and smoothing of microholes in any workpiece, e.g. fuel injector nozzles, spinnerets. A liquid abrasive slurry flows through the microholes. The abrasive liquid flow rate correlates to the target flow rate of the liquid, for example diesel fuel, for which the fuel injector nozzle is designed. When the abrasive liquid slurry of the system reaches a predetermined flow rate the process is stopped. The microholes, without further iterative calibration steps, are properly calibrated for use with the target liquid, i.e. diesel fuel.

Although the preferred embodiment of the invention is described in reference to the radiusing, polishing and smoothing of microholes, it also includes the smoothing and polishing of non-circular apertures, i.e. rectangular slots, squares elliptical configurations, etc. The square area of the non-circular apertures would typically be less than approximately 3 $mm^2$.

In a preferred embodiment, the invention is directed to radiusing and sizing the microholes in diesel fuel injectors using a liquid abrasive slurry with particular Theological properties. the abrading action at the inlet edge of the microhole results from the acceleration of slurry velocity as it enters the microhole. The radius produced and the finish imparted to the microhole is similar to that of abrasive flow machining. However, the relatively low slurry viscosity and its low abrasiveness at low velocity enables the use of a flow meter in the slurry flow path which can directly and accurately monitor slurry flow rate and slurry mass flow in real time. Therefore, tight process control is attained as compared with conventional abrasive flow machining. In the preferred embodiment of the invention, the slurry flow is correlated to diesel fuel flow rates. This allows for individual slurry processing of nozzles to their specified flow rates.

It is an object of the present invention to provide a method of radiusing and sizing microholes.

Another object is to provide a method for attaining a predetermined flow resistance through microholes with an abrasive liquid slurry having a flow rate which correlates to the flow rate of a target liquid.

A further object is to provide fuel injector nozzles having orifices with reproducible, precise, predetermined flow resistances.

DESCRIPTION OF THE PREFERRED EMBODIMENT(S)

Figure 1:
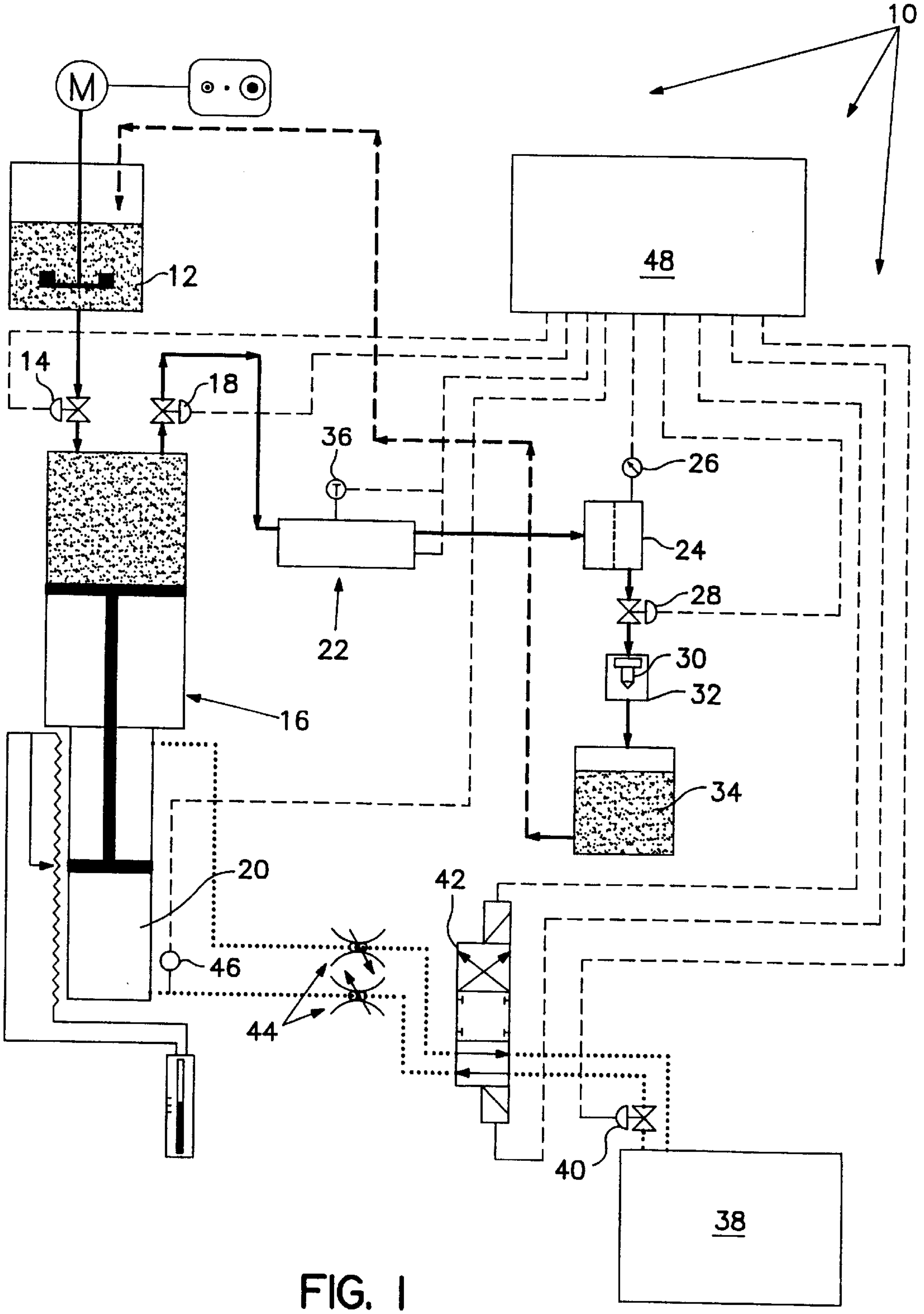
FIG. 1 is a schematic flow diagram of a system embodying the invention.

Referring to FIG. 1, the system is shown generally at 10 and comprises an inlet tank 12 with an associated valve 14. The inlet tank 12 communicates with a slurry cylinder 16 having an associated valve 18. A hydraulic cylinder 20 communicates with and drives the slurry from the cylinder 16. The slurry flows through a Coriolus flow meter 22. Downstream of the flow meter 22 is a filter 24 with an associated pressure transducer 26. A dispensing valve 28 is downstream of the filter 24 which in turn is upstream of a fixture 32. A nozzle 30 is secured in the fixture 32. The slurry flowing through the nozzle 30 is discharged into an outlet tank 34. Alternatively, the slurry can be recycled back to the inlet tank 12. Also, for general data collection purposes there is a temperature transducer 36.

A hydraulic power unit 38 in combination with a proportional control valve 40, a directional valve 42 and flow control valves 44, drives the hydraulic cylinder 20 to maintain constant pressure of the slurry flowing through the nozzle 30, as will be described. For general data collection purposes, a transducer 46 measures the pressure applied to the hydraulic cylinder 20.

A process controller (for example, a programmable logic controller) 48 receives data from the pressure transducers 26 and 46 and the flow meter 22 and also communicates with and controls the valves 14, 18, 28, 40 and 42.

The liquid abrasive slurries of the invention are based on a low viscosity napthenic mineral oil and rheological additives, and are gritted with #400–#1000 mesh abrasive, i.e. silicon carbide, boron carbide, garnet, diamond. The slurry has sufficient viscosity at low shear rates to remain homogenous and to maintain a uniform distribution of abrasive grain. At higher shear rates, upon entering the microholes, the viscosity must drop to a value low enough to permit high velocity flow. One example of a thixotropic slurry of the invention would have a viscosity of about 100,000 cps with a Brookfield Spindle #3 rotating at less than 1 rpm and a viscosity of about 800 cps with the spindle #3 at 100 rpm.

The invention will be described with reference to radiusing and polishing microholes of a fuel injector nozzle. The microholes are typically less than 1 mm diameter, say about 0.25 mm.

As will be understood it is necessary to hold the workpiece so as to confine the flow of the abrasive slurry flowing through the holes to be treated. Special adapters or tooling may be required to pass the liquid abrasive slurry into and out of the microholes. This is within the skill of the art.

Figure 2:
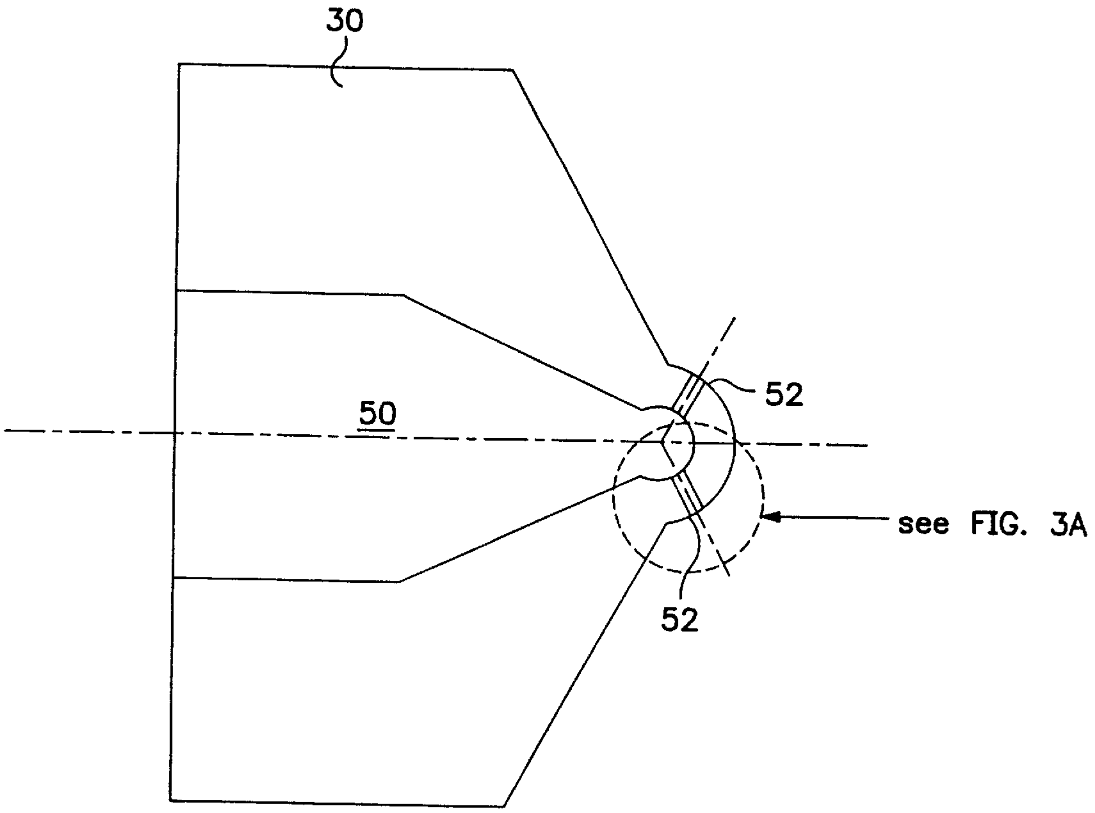
FIG. 2 is a schematic of a diesel fuel injector nozzle.
Figure 3A:
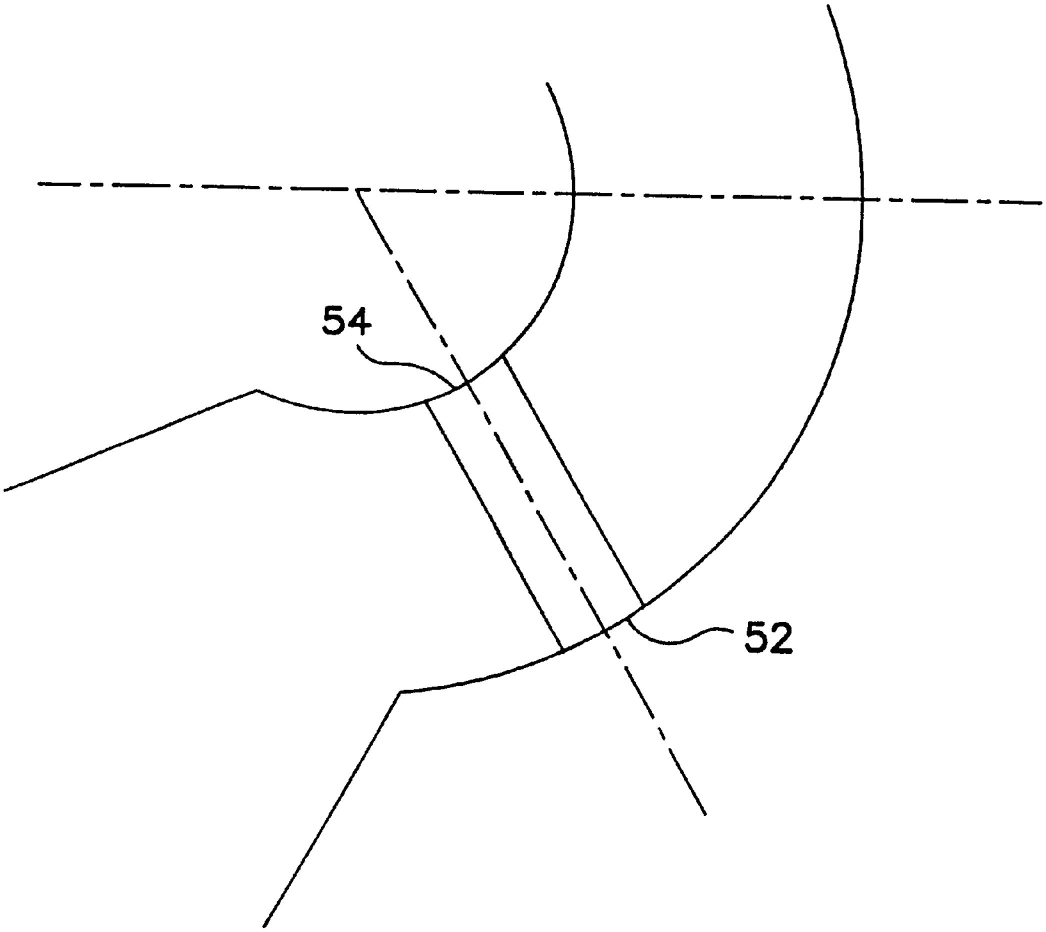
FIG. 3*a* is an illustration of a fuel injector nozzle prior to radiusing and smoothing.
Figure 3B:
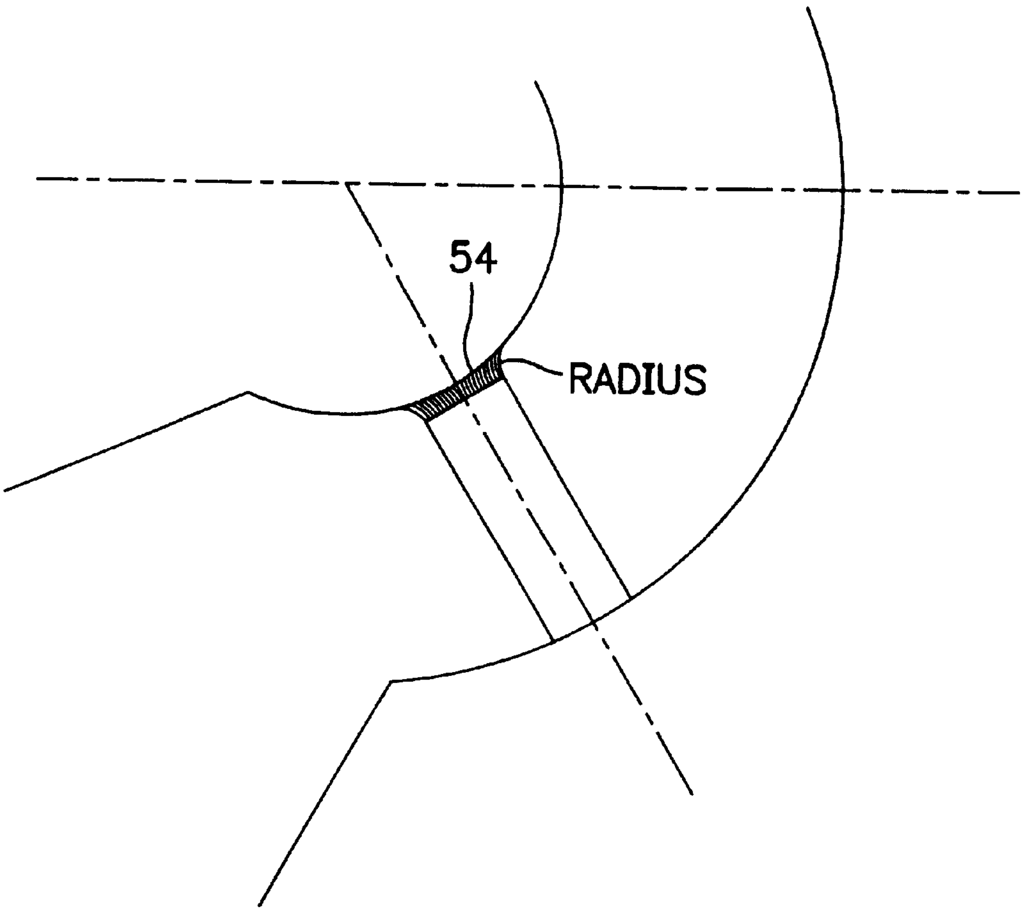
FIG. 3*b* is an illustration of the fuel injector nozzle after radiusing and smoothing.

Referring to FIG. 2, the fuel injector nozzle 30 comprises a flow chamber 50 in communication with microholes 52. A microhole 52, prior to radiusing and polishing, is shown in greater detail in FIG. 3*a*. The upstream edge 54 is sharp and the hole is non-uniform and not polished. As shown in FIG. 3*b*, after the abrasive slurry flows through the microhole, the upstream edge 54 has been radiused and the microhole polished.

In the system of the invention, the pressure immediately upstream of the fuel injector nozzle 30 is maintained at a constant pressure. The flow rate through the microholes 50 of the fuel injector nozzle increases until a target flow rate is reached at which point the flow is ceased.

Referring to FIG. 1 in the operation of the invention, the valves 14 is initially opened and valves 18 and 28 are closed. The slurry cylinder 16 is charged.

The inlet tank valve 14 is closed, the dispensing valve 28 remains closed and the valve 18 is opened. The hydraulic power unit 38 is actuated to pressurize the system to the desired pressure based on the reading of the pressure transducer 26. In this closed loop system, the system is allowed to stabilize at the set pressure.

The dispensing valve 28 is then opened and the slurry commences to flow through the microholes 52 of the nozzle 30 and into the inlet tank 34.

The flow rate from the flow meter 22 is constantly measured while the hydraulic power unit maintains constant nozzle pressure.

Figure 4:
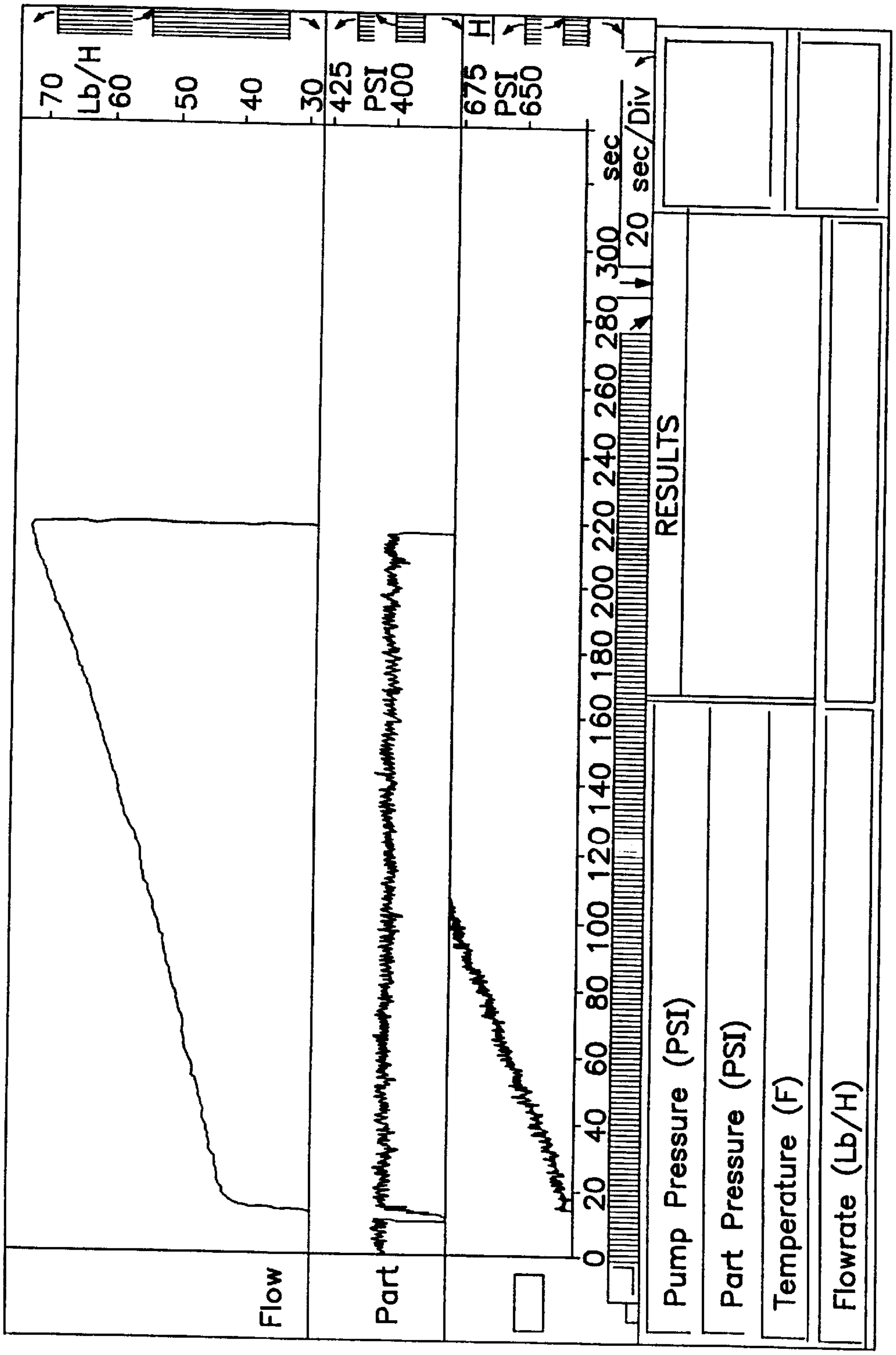
FIG. 4 is a chart illustrating the various process parameters controlled in the system of the invention.

FIG. 4 is a chart of the flow rate of a slurry through the microholes of a nozzle, the pressure maintained immediately upstream of the nozzle and the pressure generated by the hydraulic power unit. This chart illustrates the process of the invention. For this specific example, the design flow rate was 72.872 lbs. per hr., six microholes, 0.0081" diameter. As shown, the radiusing and polishing of the microholes commenced with a slurry flow rate at about 40 lbs. per hr. The pressure immediately upstream of the nozzle was maintained constant throughout the process at about 400 psi. The pressure generated by the hydraulic power unit continued to increase and based on the ranges used for FIG. 4 it does not appear in the chart after 675 psi.

When the design flow rate was reached, the process was stopped and the microholes were polished and radiused as shown in FIG. 3*b*.

With the present invention, a predetermined flow rate through the workpiece at a fixed pressure measured just upstream of the workpiece directly correlates to a target rate of flow of a design fluid in its intended working environment. It has been found that for diesel calibration fluids, where the design flow rate for the microholes (0.008" diameter) (0.25 mm) of the nozzles is about 250 lbs. per hr., that when an abrasive liquid slurry according to the invention, reaches a flow rate of 98 lbs. per hr. at 400 psi, this will correlate to the target or design flow rate for the fuel injector nozzle.

The slurry for use in the invention is a liquid material having a Theological additive and finely divided abrasive particles incorporated therein. The rheological additive creates a thixotropic slurry.

One suitable liquid for carrying the abrasive particles is a napthenic oil Exxon Telura 315.

Obviously, the abrasive used in the liquid will be varied to suit the microhole being polished and radiused. A satisfactory abrasive for use in working on diesel fuel injector microholes is silicon carbide. The abrasive can be added to the liquid in an amount of 5 to 50% by weight, preferably 15 to 35% by weight based on the total weight of the slurry.

An additive which imparts the Theological properties to the slurry is low molecular weight polyethylene Allied Signal AC-9. The additive can be added to the oil in an amount of 2 to 12% by weight, preferably 4 to 8% by weight based on the total weight of the slurry.

For polishing and radiusing the microholes, i.e. less than 1 mm, the pressure just upstream of the injector work piece or injector fuel nozzle can be between about 100 to 2,000 psi, preferably between 400 to 1,000 psi. The flow rate of the slurry through the flowmeter (equivalent flow per hole) can vary between 2 to 50 lbs. per hr., preferably 20 to 30 lbs. per hr.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. An abrasive liquid slurry for polishing and radiusing a microhole, said abrasive liquid slurry comprising:

a liquid media;

a rheological additive; and abrasive particles, wherein the slurry is characterized in that the abrasive particles remain uniformly distributed when the slurry is not subjected to shear, and the slurry decreases in viscosity when subjected to shear flowing through a microhole at a pressure of between 400 to 1000 psi.

2. The abrasive liquid slurry of claim 1, wherein said liquid media is cutting fluid or honing fluid.

3. The abrasive liquid slurry of claim 1, wherein said liquid media is napthenic mineral oil.

4. The abrasive liquid slurry of claim 2, wherein said napthenic mineral oil is low viscosity.

5. The abrasive liquid slurry of claim 2, wherein said abrasive particles are selected from the group consisting of silicon carbide, boron carbide, garnet and diamond.

6. The abrasive liquid slurry of claim 5, wherein said abrasive particles are added in the amount of 5 to 50% by weight of the total slurry weight.

7. The abrasive liquid slurry of claim 5, wherein said abrasive particles are added in the amount of 15 to 35% by weight of the total slurry weight.

8. The abrasive liquid slurry of claim 5, wherein said abrasive particles are of a size between #400–#1000 mesh.

9. The abrasive liquid slurry of claim 2, wherein said additive is polyethylene.

10. The abrasive liquid slurry of claim 9, wherein said polyethylene is low molecular weight polyethylene.

* * * * *